United States Patent
Brown et al.

(10) Patent No.: US 7,677,653 B2
(45) Date of Patent: Mar. 16, 2010

(54) HEADLINER RETAINER CLIP

(75) Inventors: Joseph Robert Brown, Farmington Hills, MI (US); Ron Senakiewich, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 107 days.

(21) Appl. No.: 12/022,619

(22) Filed: Jan. 30, 2008

(65) Prior Publication Data

US 2009/0189418 A1 Jul. 30, 2009

(51) Int. Cl.
*B60R 13/02* (2006.01)
(52) U.S. Cl. .............. 296/214; 296/216.06; 296/216.07
(58) Field of Classification Search ................. 296/214, 296/216.06, 216.07, 216.08; B60R 13/02
See application file for complete search history.

(56) References Cited

U.S. PATENT DOCUMENTS

| | | | |
|---|---|---|---|
| 3,889,320 A * | 6/1975 | Koscik | ........................ 24/297 |
| 5,061,108 A | 10/1991 | Bien et al. | |
| 5,105,521 A | 4/1992 | Dowd et al. | |
| 5,186,517 A | 2/1993 | Gilmore et al. | |
| 5,226,695 A | 7/1993 | Flint et al. | |
| 5,636,891 A | 6/1997 | Van Order et al. | |
| 5,876,084 A | 3/1999 | Smith et al. | |
| 6,231,111 B1 | 5/2001 | Carter et al. | |
| 6,490,788 B2 | 12/2002 | Carter et al. | |
| 6,491,339 B2 | 12/2002 | Flores | |
| 6,607,233 B1 | 8/2003 | Beaver et al. | |
| 6,769,727 B2 | 8/2004 | Delavalle et al. | |
| 7,168,138 B2 | 1/2007 | Lubera et al. | |
| 2002/0197107 A1 | 12/2002 | Granata | |
| 2004/0081537 A1 | 4/2004 | Nishikawa | |
| 2006/0127172 A1 | 6/2006 | Tisol, Jr. | |
| 2006/0168773 A1 | 8/2006 | Smith et al. | |
| 2007/0046054 A1 | 3/2007 | Hinman et al. | |
| 2007/0200314 A1 | 8/2007 | Anderson et al. | |
| 2007/0228777 A1 | 10/2007 | Mollick et al. | |

* cited by examiner

*Primary Examiner*—Dennis H Pedder
*Assistant Examiner*—Pinel E Romain
(74) *Attorney, Agent, or Firm*—Young Basile

(57) ABSTRACT

A retainer assembly for connecting a headliner panel to a support structure. A retainer clip is configured to connect the support structure to the headliner panel. A slot is defined in the support structure and configured to receive s stem portion of the retainer clip. The slot and the stem portion cooperate to define a float length and a float width, which define a range of motion over which the headliner panel is longitudinally and transversely moveable with respect to the support structure.

13 Claims, 5 Drawing Sheets

HEADLINER RETAINER CLIP

FIELD OF THE INVENTION

The invention relates to the field of retainer clips for fastening a trim panel to a structural component of a motor vehicle.

BACKGROUND

There are numerous well known retainer clips for securely fastening a trim panel to a structural component of a motor vehicle. These clips generally connect a predetermined connection point on the trim panel to a predetermined connection point on the motor vehicle.

When the trim panel contacts or is connected to two or more components of the motor vehicle, tolerances between the interrelated parts can cause substantial misalignment between the connection point on the trim panel and the connection point on the structural component of the motor vehicle. During assembly of the motor vehicle, the assembly technician responsible for fastening the trim panel to the structural component may compensate for this misalignment by exerting force upon the trim panel, creating both a manufacturing inefficiency and a risk that the trim panel may be broken. Furthermore, when the assembly technician responsible for fastening the trim panel is tasked with installing a very large trim panel, such as headliner panel, further manufacturing inefficiency arises due to the unwieldy nature of the panel.

Subsequent to connection of the trim panel to the body structural component, significant stresses may develop within the retainer clip due to the misalignment between the connection point on the trim panel and the connection point on the structural component of the motor vehicle. This causes a potential for damage, squeak and rattle noise, and warranty claims seeking repair of the clip and/or the trim panel.

SUMMARY

One retainer assembly for connecting a headliner panel to a support structure taught herein includes a retainer clip and a slot defined in the support structure. The retainer clip includes a stem portion and a head portion connected to the stem portion. The stem portion has a stem length and a stem width. The head portion also has a head length and a head width.

The slot is defined in the support structure and configured to receive the stem portion of the retainer clip. The slot has a slot length in a longitudinal direction and a slot width in a transverse direction, such that a float length is defined by the difference between the slot length and stem length and a float width is defined by the difference between the slot width and the stem width.

The headliner panel is longitudinally and transversely moveable with respect to the support structure over a range of motion defined by the float length and the float width, and the head width and the head length of the head portion are dimensioned to maintain engagement between the head portion of the retainer clip and the support structure over the range of motion.

Methods for mounting a headliner panel with respect to the roof of a motor vehicle are also taught herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
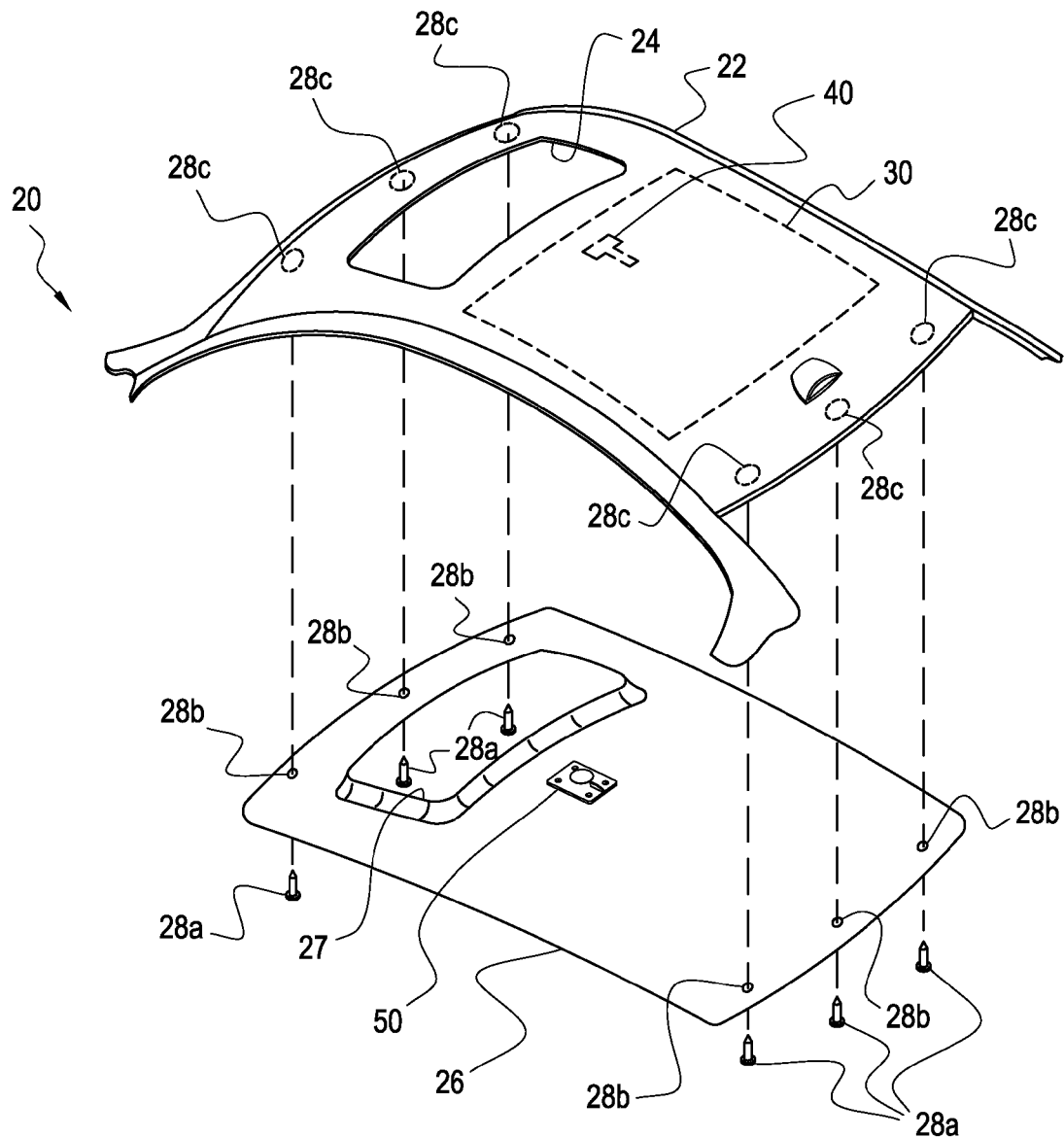
FIG. 1 is an exploded perspective view showing a portion of a motor vehicle including a roof, a sunroof assembly, and a headliner panel.

As shown in FIG. 1, the invention most generally comprises a retainer assembly that is particularly applicable to a motor vehicle 20 having a roof 22 with a sunroof opening 24 defined therein. A sunroof frame 30 is connected to an interior surface of the roof 22, and is configured to support a sunroof assembly (not shown) that includes the sunroof panel (not shown) and associated mechanical and electrical components. A headliner panel 26 is provided to cover the interior surface of roof 22 as well as the sunroof frame 30, and the headliner panel has a sunroof opening 27 defined therein that corresponds to the sunroof opening 24 in the roof 22. The retainer assembly is configured to connect the headliner panel 26 to a support structure, such as the sunroof frame 30. However, it should be understood that the retainer assembly is not limited in applicability to motor vehicles 20 equipped with a sunroof, and thus, the support structure may be the roof 22 itself, or any structure disposed on the interior surface of the roof 22 of the motor vehicle 20 that is interposed between the roof 22 and the headliner panel 26.

In order to connect the headliner panel 26 to the sunroof frame 30, or other support structure, a retainer clip 50 and a slot 40 are provided. The retainer clip 50 is connected to the headliner panel 26 at an intermediate location thereon, such as a transversely centered location to the rear of the sunroof opening 27 of the headliner panel 26, and the slot 40 is formed in the sunroof frame 30 at a complementary location. As will be explained further herein, the retainer clip 50 and the slot 40 cooperatively engage one another to define a range of motion over which the headliner panel 26 is transversely and longitudinally moveable with respect to the sunroof frame, while maintaining engagement between the retainer clip 50 and the sunroof frame 30. As will also be explained further herein, the position of the headliner panel 26 with respect to the sunroof frame 30 and the roof 22 may be fixed, for example, using a plurality of fasteners 28a that extend through apertures 28b formed through the headliner panel near the periphery thereof, and engage complementary fasteners 28c disposed on the interior surface of the roof 22. Furthermore, although the description herein contemplates connecting the headliner panel 26 to the sunroof frame 30 using a single retainer clip 50 and slot 40, it should be understood that multiple retainer clips 50 and slots 40 could be provided, for example, at spaced locations around the periphery of the sunroof frame 30.

Figure 2:
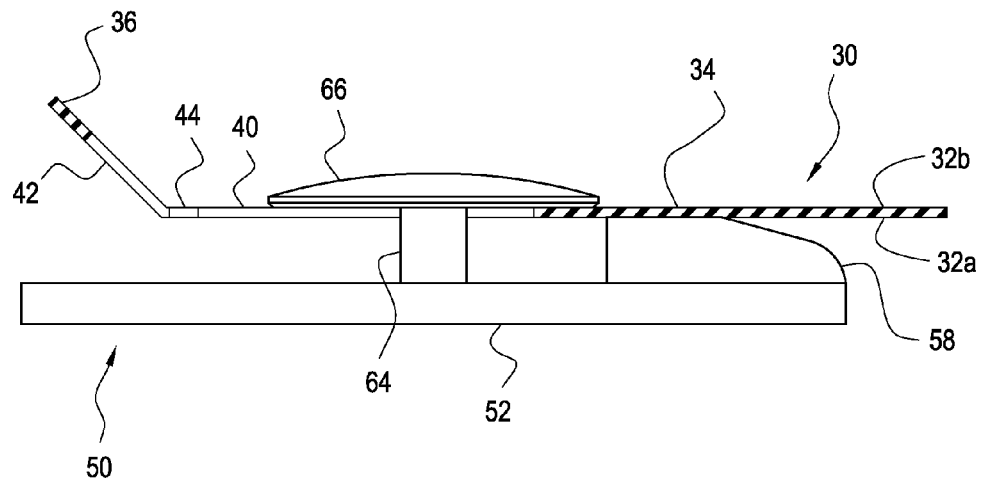
FIG. 2 is a side cross sectional view of a retainer clip according to an embodiment of the invention supporting the headliner with respect to the sunroof assembly.

So that the headliner panel 26 may be suspended from the sunroof frame 30, the slot 40 and the retainer clip 50 cooperate to define a disengaged position, wherein the retainer clip 50 is not disposed within the slot 40, and an engaged position, wherein at least a portion of the retainer clip 50 is disposed within the slot, as shown in FIG. 2.

The sunroof frame 30 is fabricated from a thin, sheet-like material, such as sheet metal, which defines a lower surface 32a opposite an upper surface 32b. The sunroof frame 30 includes a first portion 34 that is substantially horizontal and substantially planar. The sunroof frame 30 may also include a second portion 36 that extends upwardly at an angle with respect to the first portion 34.

The slot 40 is formed through the first portion 34 of the sunroof frame 30, and thus extends through the sunroof frame 30 between the lower surface 32a and the upper surface 32b thereof. In order to allow the retainer clip 50 to move into and out of the slot 40, an opening 42 that is transversely wider than the slot 40 is formed through the second portion 36 of the sunroof frame 30 in communication with the slot 40. The slot 40 and the opening 42 meet at a transition 44, which may be a taper, a radius, a step, or any other geometric feature suitable to connect openings of disparate widths to one-another for communication with one another. Of course the transition 44 may be located either on the first portion 34 of the sunroof frame 30, in which case at least part of the opening 42 extends through the first portion 34 of the sunroof frame 30, or on the second portion 36 of the sunroof frame 30, in which case at least part of the slot 40 extends through the second portion 36 of the sunroof frame 30.

Figure 3:
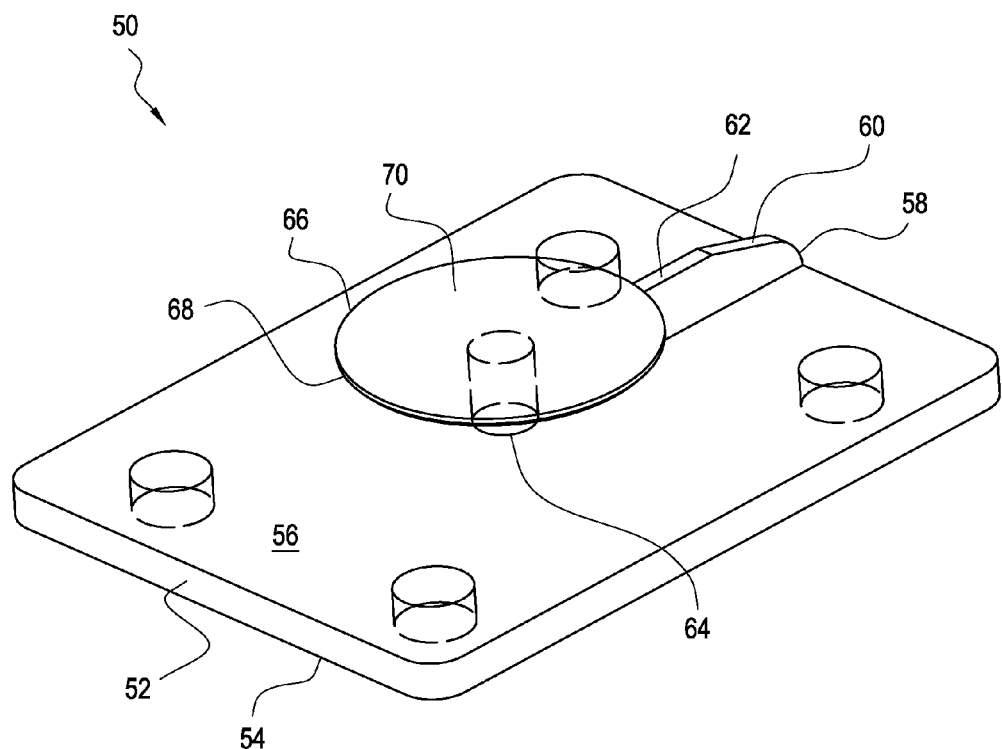
FIG. 3 is a perspective view of the retainer clip of FIG. 2.

As best seen in FIG. 3, the retainer clip 50 includes a base portion 52, a fin portion 58 that is connected to the base portion 52, a stem portion 64 that is connected to the base portion 52, and a head portion 62 that is connected to the stem portion 64. The retainer clip 50 may be fabricated as an integral body. For example, the retainer clip 50 may be fabricated from plastic by injection molding. However, the retainer clip 50 need not be formed integrally, and the portions thereof could be, for example, separately formed and subsequently rigidly connected to one another by any suitable method. Furthermore, the portions of the retainer clip need not be rigidly connected, as it is sufficient that the base portion 52, the fin portion 58, the stem portion 64 and the head portion 62 of the retainer clip 50 simply be operatively connected to one another.

The base portion 52 is substantially planar, and has a bottom surface 54 as well as a top surface 56 opposite the bottom surface 54. The bottom surface 54 of the base portion 52 is configured to be connected to the headliner panel 26, for example, by adhesives, ultrasonic welds, or other suitable means. However, it should be understood that instead of being connected to the headliner panel 26, the retainer clip 50 could be formed integrally with the headliner panel 26, in which case the base portion 52 would be a portion of the headliner panel 26.

The fin portion 58 of the retainer clip 50 extends upward from the top surface 56 of the base portion 52. To guide the retainer clip 50 into engagement with the sunroof frame 30, the fin portion 58 includes a chamfered engagement surface or a ramp surface 60 or that extends upwardly and inwardly with respect to the front end of the base portion 52 of the retainer clip 50. A top surface 62 of the fin portion 58 is configured to engage the lower surface 32a of the sunroof frame 30, and thus stabilize the retainer clip 50 with respect to the sunroof frame 30. The top surface 62 of the fin portion 58 may be substantially planar and substantially horizontal, although this need not be the case, and other configurations may be provided. The fin portion 58 and the stem portion 64 may be longitudinally aligned with respect to one another. However, it should be appreciated that the fin portion 58 need not be aligned with the stem portion 64, and other configurations may be provided. Furthermore, the fin portion 58 may be provided in any desired length. For example, the fin may extend from a leading edge of the base portion 52 to a location just short of the head portion 66, or may extend at least partially under the head portion.

The stem portion 64 of the retainer clip 50 is an elongate member that is connected to the base portion 52 of the retainer clip 50 at one end thereof, and extends substantially perpendicular to the base portion 52. The opposite end of the stem portion 64 is connected to the head portion 66 of the retainer clip 50, and thus, the stem portion 64 serves to space the head portion 66 with respect to the base portion 52. The stem portion 64 may be provided in any desired shape, for example, cylindrical or rectangular.

The head portion 66 of the retainer clip 50 is configured to engage the sunroof frame 30 to suspend the headliner panel 26 from the sunroof frame 30. The head portion 66 has a lower surface 68, by which the head portion 66 is connected to the stem portion 60 of the retainer clip 50, and an upper surface 70 opposite the lower surface 68. The head portion 66 may be substantially disc-shaped, or may be provided in any other desired shape.

When the retainer clip 50 is in the engaged position with respect to the sunroof frame 30, the stem portion 64 of the retainer clip 50 extends through the slot 40, and the lower surface 68 of the head portion 66 normally engages the upper surface 32b of the sunroof frame 30 to thereby suspend the headliner panel 26 with respect to the sunroof frame 30. Optionally, the upper surface 62 of the fin portion 58 of the retainer clip 50 may engage the lower surface 32a of the sunroof frame 30 while the retainer clip 50 is in the engaged position.

In the engaged position, the retainer clip 50 is longitudinally and transversely moveable with respect to the sunroof frame 30, and a range of motion is defined by extents over which the retainer clip 50 is moveable with respect to the sunroof frame 30 while engagement of the head portion 66 with the sunroof frame 30 is maintained. Although the range of motion is defined as movement of the retainer clip 50 with respect to the sunroof frame 30, it should be understood that the range of motion could also be described with reference to the headliner panel 26 or the roof 22, since the position of the headliner panel 26 is fixed with respect to the retainer clip 50, and the position of the sunroof frame 30 is fixed with respect to the roof 22.

Figure 4A:
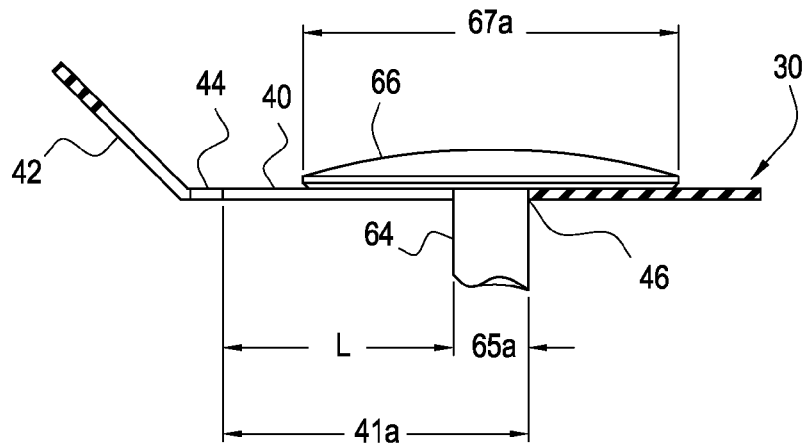
FIG. 4A is a side cross sectional view of a head portion and a stem portion of the retainer clip of FIG. 2.

The longitudinal range of motion of the retainer clip 50 with respect to the sunroof frame 30 will be better understood with reference to FIG. 4A. The slot 40 has a slot length 41a, which is defined as the distance over which the stem portion 64 of the retainer clip 50 extends through the slot 40 and while supporting engagement is maintained between the sunroof frame 30 and the head portion 66. For example, the slot length 41a may be defined as the distance between a rear wall 46 of the slot 40 and the transition 44. Furthermore, the stem 64 has a stem length 65a, and a float length L is defined by the difference between the slot length 41a and the stem length 65a. Additionally, the head portion 66 of the retainer clip 50 has a head length 67a that is dimensioned to maintain engagement between the head portion 66 and the sunroof frame 30 throughout the float length L. Thus, the float length L represents the longitudinal distance by which the retainer clip 50 is moveable with respect to the sunroof frame 30.

Figure 4B:
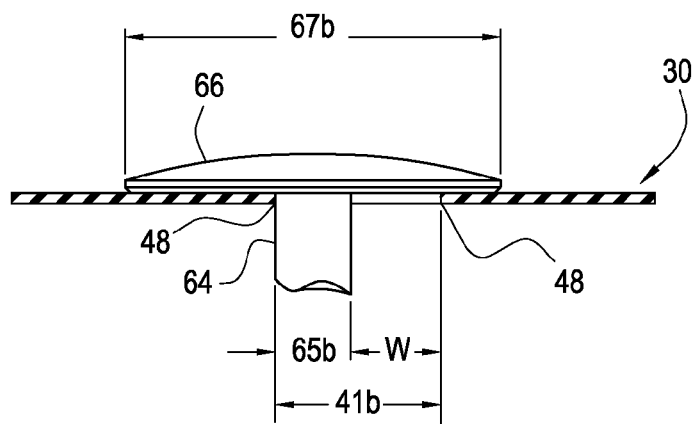
FIG. 4B is a rear cross sectional view of a head portion and a stem portion of the retainer clip of FIG. 2.

The transverse range of motion of the retainer clip 50 with respect to the sunroof frame 30 will be better understood with reference to FIG. 4B. The slot 40 has a slot width 41b, which is defined as the distance between a pair of opposed side walls 48 of the slot 40. Furthermore, the stem 64 has a stem width 65b, and a float width W is defined by the difference between the slot width 41b and the stem width 65b. Additionally, the head portion 66 of the retainer clip 50 has a head width 67b that is dimensioned to maintain engagement between the head portion 66 and the sunroof frame 30 throughout the float width W. Thus, the float width W represents the transverse distance by which the retainer clip 50 is moveable with respect to the sunroof frame 30.

The range of motion defined by the float length L and the float width W allows the position of the headliner panel 26 to be adjusted over the range of motion so that the apertures 28b formed through the headliner panel may be aligned with respect to the fasteners 28c disposed on the interior surface of the roof 22 while the headliner panel 26 remains suspended from the sunroof frame 30. In this manner, the tolerances at which other components are installed with respect to one another may be less precise without sacrificing build quality or causing complications during assembly.

In view of the foregoing, the value of the float length L may be calculated by first determining a composite longitudinal tolerance value, by adding the maximum longitudinal tolerance of the support structure, such as the sunroof frame 30, with respect to the roof 22, to a maximum longitudinal tolerance of the headliner panel 26 with respect to the roof 22, for example, at the connection between the fasteners 28a and the fasteners 28c. Then, a slot length value and a stem length value are calculated such that the longitudinal float length L, as a difference of the slot length value and the stem length value, is equal to or greater than the combined longitudinal tolerance value. Then, the slot 40 is formed in the sunroof frame 30 having a slot length 41a substantially equal to the slot length value. Similarly, the retainer clip 50 is provided such that the stem length 64a is substantially equal to the stem length value.

The float width W is calculated in the same manner as the float length L. Calculation of the float width W proceeds by first determining a composite transverse tolerance value, by adding the maximum transverse tolerance of the support structure, such as the sunroof frame 30, with respect to the roof 22, to the maximum transverse tolerance of the headliner panel 26 with respect to the roof 22, for example, at the connection between the fasteners 28a and the fasteners 28c. Then, a slot width value and a stem width value are calculated such that the longitudinal float width W, as a difference of the slot width value and the stem width value, is equal to or greater than the combined transverse tolerance value. Then, the slot 40 is formed in the sunroof frame 30 having a slot width 41b substantially equal to the slot width value. Similarly, the retainer clip 50 is provided such that the stem width 64b is substantially equal to the stem width value.

In use, an assembly technician tasked with mounting the headliner panel 26 with respect to the roof 22 first mounts the retainer clip 50 to the headliner panel 26, for example, by positioning the retainer clip 50 with respect to the headliner panel 26 using locator holes and pins (not shown), and securing the retainer clip 50 to the headliner panel 26 using adhesives. Next, the assembly technician orients the headliner panel 26 with respect to the roof 22, such that the retainer clip 50 is adjacent to the slot 40. Then, the assembly technician moves the retainer clip 50 from the disengaged position to the engaged position by moving the headliner panel 26 longitudinally with respect to the roof 22, such that the head portion 66 of the retainer clip 50 moves through the opening 42, and the stem 64 subsequently moves into the slot 40. With the retainer clip 50 in the engaged position, the headliner panel 26 is suspended from the sunroof frame 30, the assembly technician next aligns the apertures 28b with respect to the fasteners 28c by moving the headliner panel 26 with respect to the roof 22 and the sunroof frame 30 over the range of motion. Once the apertures 28b are aligned with respect to the fasteners 28c, the assembly technician fixes the position of the headliner panel 26 with respect to the sunroof frame 30 by inserting the fasteners 28a into the apertures 28b and connecting them to the fasteners 28c.

Figure 5:
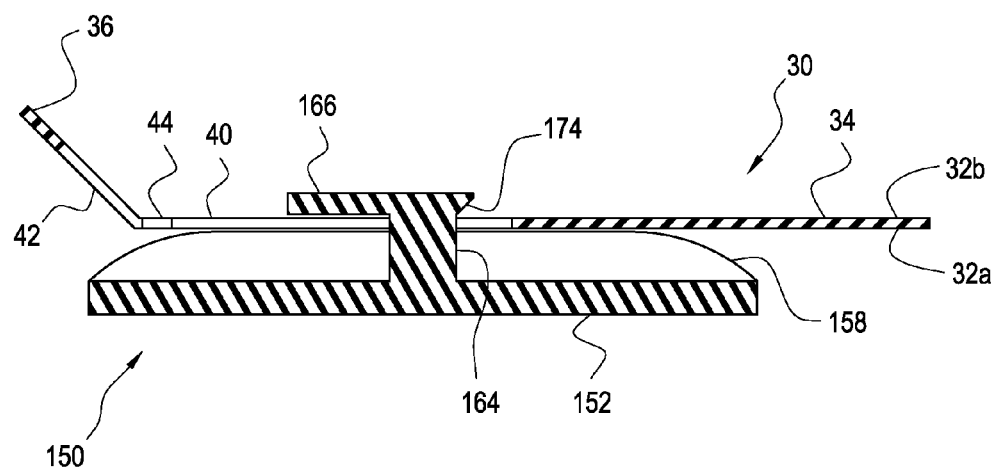
FIG. 5 a side cross sectional view of an alternative retainer clip according to another embodiment of the invention supporting the headliner with respect to the sunroof assembly.

A first alternative retainer clip 150 is shown in FIG. 5, in an engaged position with respect to the sunroof frame 30. The first alternative retainer clip 150 is similar in construction to the retainer clip 50, and cooperates with the slot 40 to define a float length L and a float width W in the same manner as described in regard to the retainer clip 50.

Figure 6:
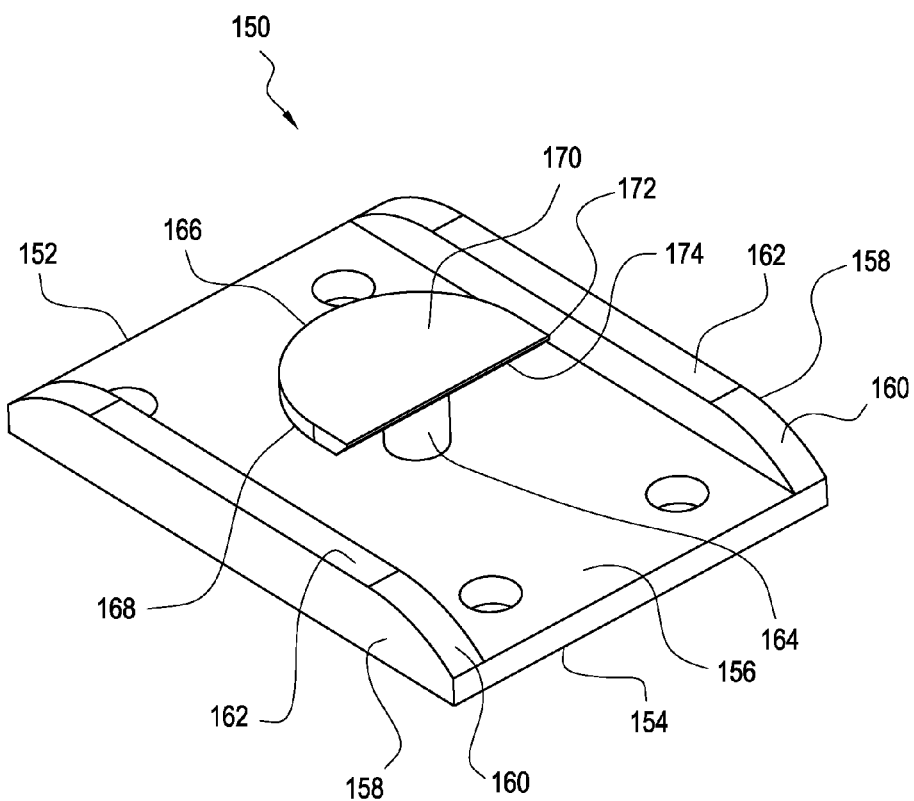
FIG. 6 is a perspective view of the alternative retainer clip of FIG. 5.

As best seen in FIG. 6, the retainer clip 150 has a base portion 152 that includes a lower surface 154 and an upper surface 156, which are substantially identical to the respective portions of the base portion 52 of the retainer clip 50. A head portion 166 is spaced from the base portion 152 by a stem portion 164, and includes a lower surface 168 and an upper surface 170. The head portion 166 also includes a transversely extending leading edge 172, and a transversely extending chamfered engagement surface 174 (best seen in FIG. 5). The transversely extending leading edge 172 defines a semi-circular shape for the head portion 166, which may, for example, prevent interference between geometric features of the sunroof frame 30 and the head portion 166 that would otherwise prevent the stem portion 164 from travelling to the rear wall 46 of the slot 40. The chamfered engagement surface 174 extends at a 45° angle with respect to the sunroof frame 30 when the retainer clip 150 is brought into engagement with the sunroof frame 30, and thus acts as a guide surface that facilitates engagement of the retainer clip 150 with respect to the sunroof frame 30.

In order to stabilize the retainer clip 150 with respect to the sunroof frame 30, the retainer clip 150 includes a pair of fin portions 158 that are transversely spaced with respect to one another and disposed on opposite sides of the stem portion 164. For example, the fin portions 158 may be rigidly connected to the base portion at the longitudinally extending side edges of the base portion 152. As with the fin portions 58 of the retainer clip 50, the fin portions 158 of the retainer clip 150 have ramp surfaces 160 to facilitate movement to the engaged position, as well as top surfaces 162 that are engageable with the sunroof frame 30.

In use, the first alternative retainer clip 150 is used in the same manner as described in connection with the retainer clip 50.

Figure 7:
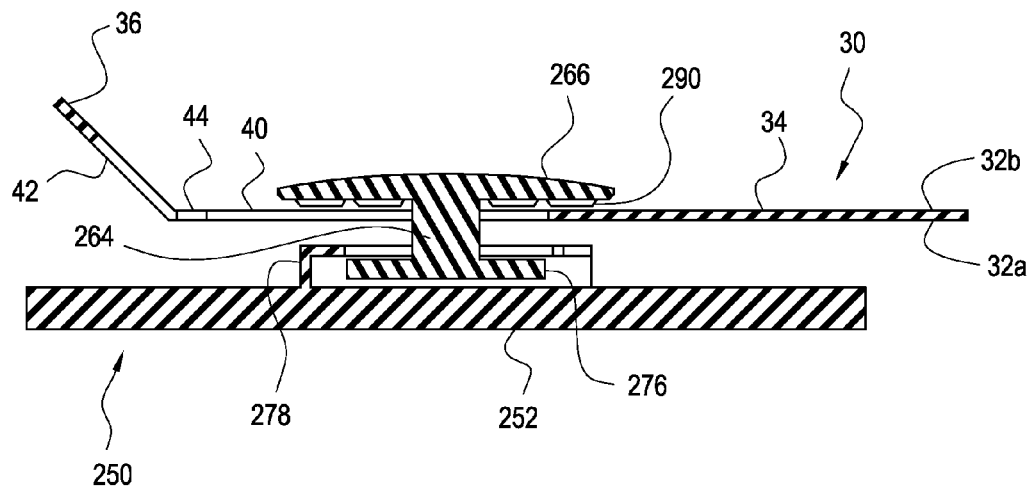
FIG. 7 a side cross sectional view of a two-piece retainer clip according to another embodiment of the invention supporting the headliner with respect to the sunroof assembly.

As another alternative, a two-part retainer clip 250 is shown in FIG. 7, in an engaged position with respect to the sunroof frame 250. The two-part retainer clip 250 is similar in construction to the retainer clip 50, and cooperates with the slot 40 to define a float length L and a float width W in the same manner as described in regard to the retainer clip 50.

Figure 8:
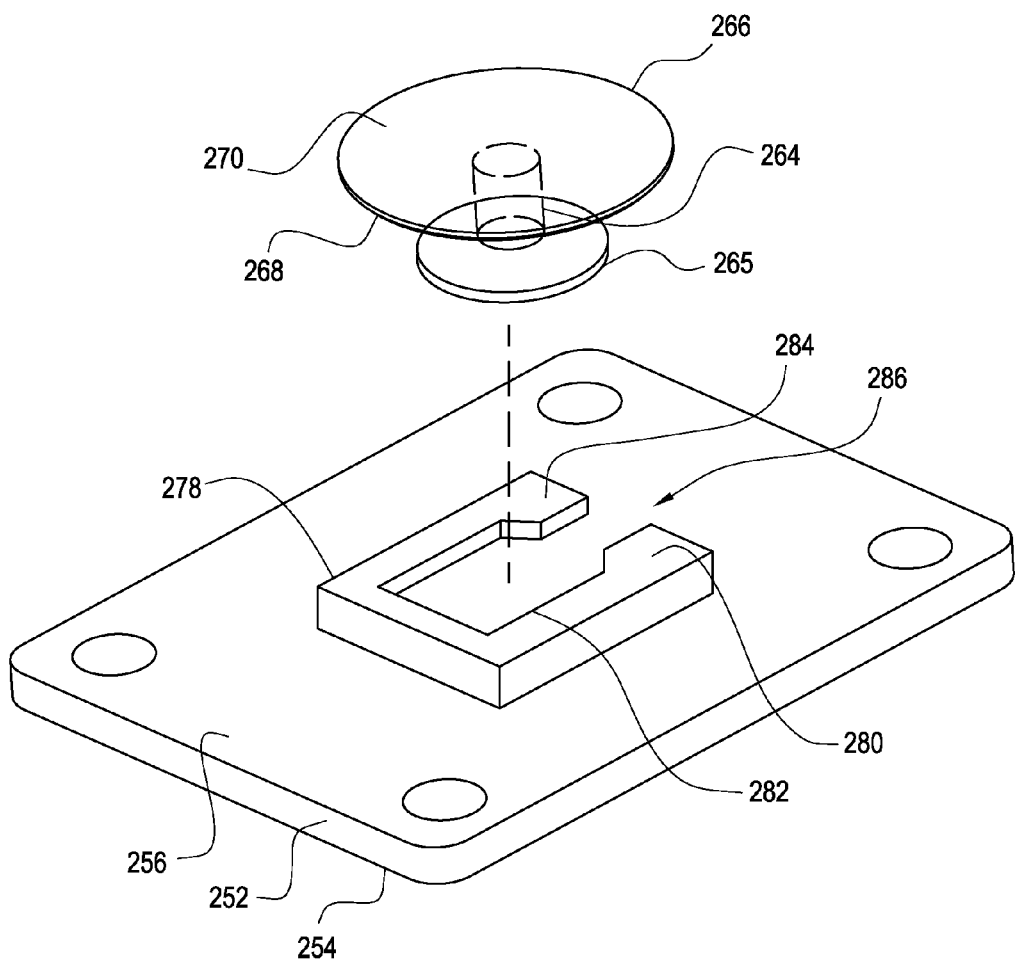
FIG. 8 is a perspective view of the two-piece retainer clip of FIG. 7.

As best seen in FIG. 8, the retainer clip 250 has a base portion 252 that includes a lower surface 254 and an upper surface 256, which are substantially identical to the respective portions of the base portion 52 of the retainer clip 50.

In order to increase the float width W and the float length L, a head portion 266 of the retainer clip 250 is spaced from a foot portion 265 by a stem portion 264. As with the head portion 66 of the retainer clip 50, the head portion 266 has a lower surface 268 and an upper surface 270. The foot portion 265 is smaller than the head portion 266, and may be a disc-shaped member having a smaller diameter than the head portion 266.

In order to connect the head portion 266 to the base portion 252, a foot slot 282 is provided on the base portion 252. More particularly, a rectangular housing 278 may extend upward from the top surface 256 of the base portion, wherein the foot slot 282 extends through a top surface 280 of the housing 278. The foot slot 282 is both wider and longer than the stem portion 264, so that the head portion 266 is both longitudinally and transversely moveable with respect to the base portion 252. The foot portion 265 is normally disposed within the housing 278, and thus the housing 278 is also both wider and longer than the foot portion 265 to allow movement of the head portion 266 with respect to the base portion 252. At a leading end of the housing 278, the housing 278 has an open end 286 that provides for insertion and removal of the foot portion 265 from the housing. In order to prevent accidental removal of the foot portion 265 from the housing, a neck 284 that is slightly wider than the stem portion 264 is formed at one end of the slot 282, in communication with the open end 286 of the housing 278.

To reduce noise and vibration, at least one projection, such as bumps or ridges 290, are provided on the lower surface 268 of the head portion 266. The ridges 290 engage the sunroof frame 30 to provide even contact between the head portion 266 and the sunroof frame 30. Of course, it should be understood that the ridges 290 could be applied to the previously described retainer clips as well. For example, the retainer clip 50 and the retainer clip 150 could be provided with features similar to the ridges 290 on the upper surfaces 62, 162 of the fins 58, 158 thereof.

In use, the two-piece retainer clip 250 is used in the same manner as described in connection with the retainer clip 50.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A retainer assembly for connecting a headliner panel to a support structure, the retainer assembly comprising:
   a retainer clip configured to connect the support structure to the headliner panel, the retainer clip including a stem portion and a head portion connected to the stem portion, the stem portion having a stem length and a stem width, and the head portion having a head length and a head width; and
   a slot defined in the support structure and configured to receive the stem portion of the retainer clip, the slot having a slot length in a longitudinal direction and a slot width in a transverse direction, such that a float length is defined by the difference between the slot length and stem length and a float width is defined by the difference between the slot width and the stem width,
   wherein the headliner panel is longitudinally and transversely moveable with respect to the support structure over a range of motion defined by the float length and the float width, and the head width and the head length of the head portion are dimensioned to maintain engagement between the head portion of the retainer clip and the support structure over the range of motion.

2. The retainer assembly of claim 1, further comprising:
   the retainer clip having a fin portion engageable with the support structure for stabilizing the retainer clip with respect to the support structure.

3. The retainer assembly of claim 2, wherein the fin portion of the retainer clip and the stem portion of the retainer clip are longitudinally aligned.

4. The retainer assembly of claim 2, further comprising:
   a chamfered engagement surface formed on the fin portion of the retainer clip on a leading end thereof.

5. The retainer assembly of claim 1, further comprising:
   the retainer clip having a pair of fins, wherein the fins of the pair of fins are transversely spaced with respect to one another and are disposed on opposite sides of the slot with respect to one another.

6. The retainer assembly of claim 5, further comprising:
   the retainer clip having a base portion having a pair of transversely spaced side edges, wherein each fin of the pair of fins is rigidly connected to the base portion at a respective side edge thereof.

7. The retainer assembly of claim 1, further comprising:
   a transversely extending chamfered engagement surface formed on the head portion of the retainer clip on a leading end thereof.

8. The retainer assembly of claim 1, further comprising:
   the retainer clip having a base portion having a lower surface connected to the headliner panel and an upper surface opposite the lower surface, wherein the stem portion is rigidly connected to the base portion opposite the head portion.

9. The retainer assembly of claim 1, further comprising:
   the retainer clip having a base portion connected to the headliner panel; and
   the base portion having a foot slot formed thereon and a foot portion connected to the stem portion opposite the head portion, wherein the foot portion is disposed within the foot slot to allow movement of the head portion with respect to the base portion in the longitudinal and transverse directions.

10. The retainer assembly of claim 1, further comprising:
    the head portion having at least one projection formed on a lower surface thereof to maintain engagement of the head portion with respect to the support structure.

11. In a motor vehicle having a roof with a sunroof opening formed therein, a sunroof frame, and a headliner panel, the improvement comprising:
    a retainer clip configured to connect the sunroof frame to the headliner panel, the retainer clip including:
    a base portion having a lower surface connected to the headliner panel and an upper surface opposite the lower surface,
    a stem portion connected to the base portion, the stem portion having a stem length and a stem width,
    a head portion having a lower surface connected to the stem portion and an upper surface opposite the lower surface, the head portion having a head length and a head width, and the lower surface of the head portion engageable with an upper surface of the sunroof frame, and
    at least one fin connected to the upper surface of the base portion and engageable with a lower surface of the sunroof frame; and
    a slot extending through the sunroof frame from the upper surface thereof to the lower surface thereof, the slot configured to receive the stem portion of the retainer clip, the slot having a slot length in a longitudinal direction and a slot width in a transverse direction, such that a float length is defined by the difference between the slot length and stem length and a float width is defined by the difference between the slot width and the stein width, wherein the headliner panel is longitudinally and transversely moveable with respect to the sunroof frame over a range of motion defined by the float length and the float width, and the head width and the head length of the head portion are dimensioned to maintain engagement between the head portion of the retainer clip and the support structure over the range of motion.

12. The motor vehicle of claim 11, further comprising:
an opening extending through the sunroof frame from the upper surface thereof to the lower surface thereof and in communication with the slot, wherein the opening configured to allow the head portion of the retainer clip to pass therethrough.

13. The motor vehicle of claim 12, further comprising:
the sunroof frame having a substantially horizontal portion and an upwardly extending portion that is disposed at an angle with respect the substantially horizontal portion, wherein at least part of the slot extends through the substantially horizontal portion of the frame and at least part of the opening extends through the upwardly extending portion of the frame, and the lower surface of the head portion engages the substantially horizontal portion of the frame throughout the range of motion.

* * * * *